Nov. 6, 1928.
G. J. STRADINGER
1,690,463
MARINE PROPULSION AND POWER GENERATOR
Filed April 4, 1927  2 Sheets-Sheet 1
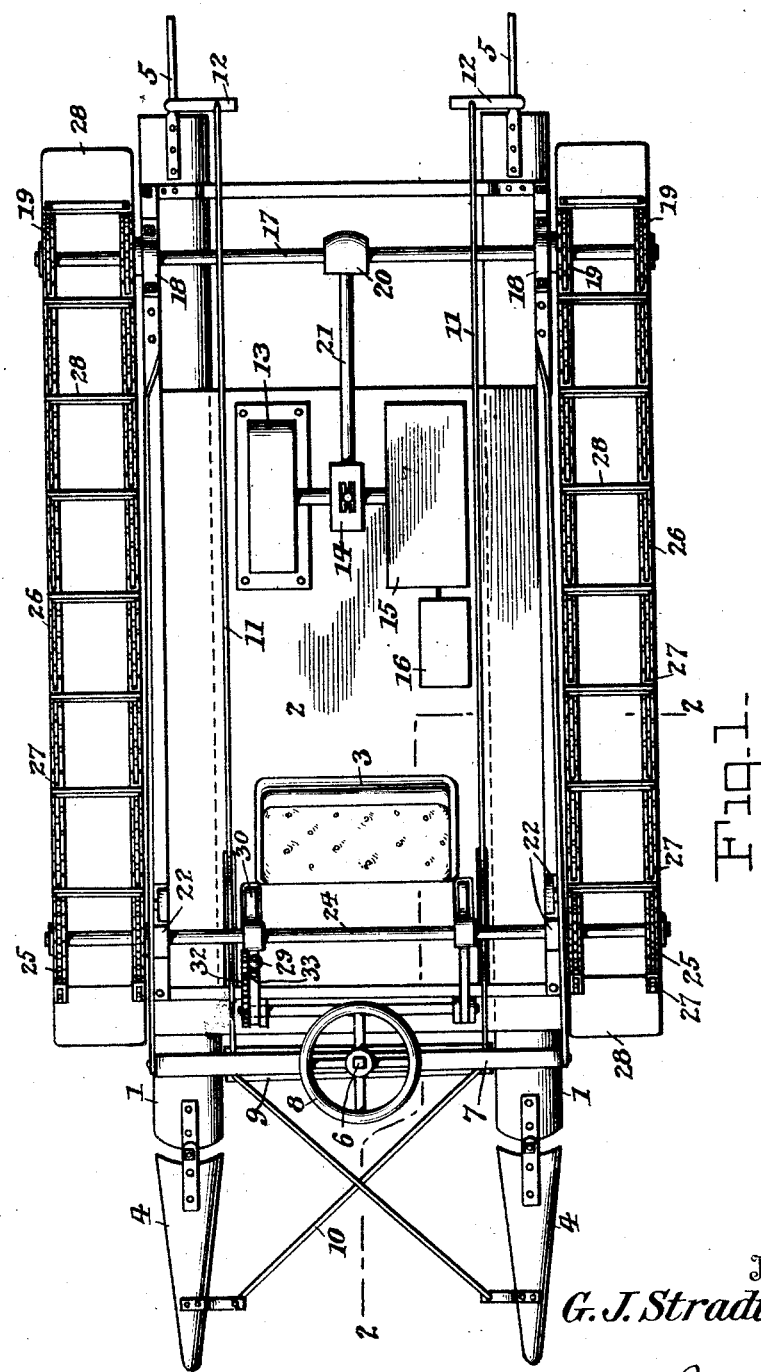
Inventor
G. J. Stradinger
By Jacobi & Jacobi
Attorneys

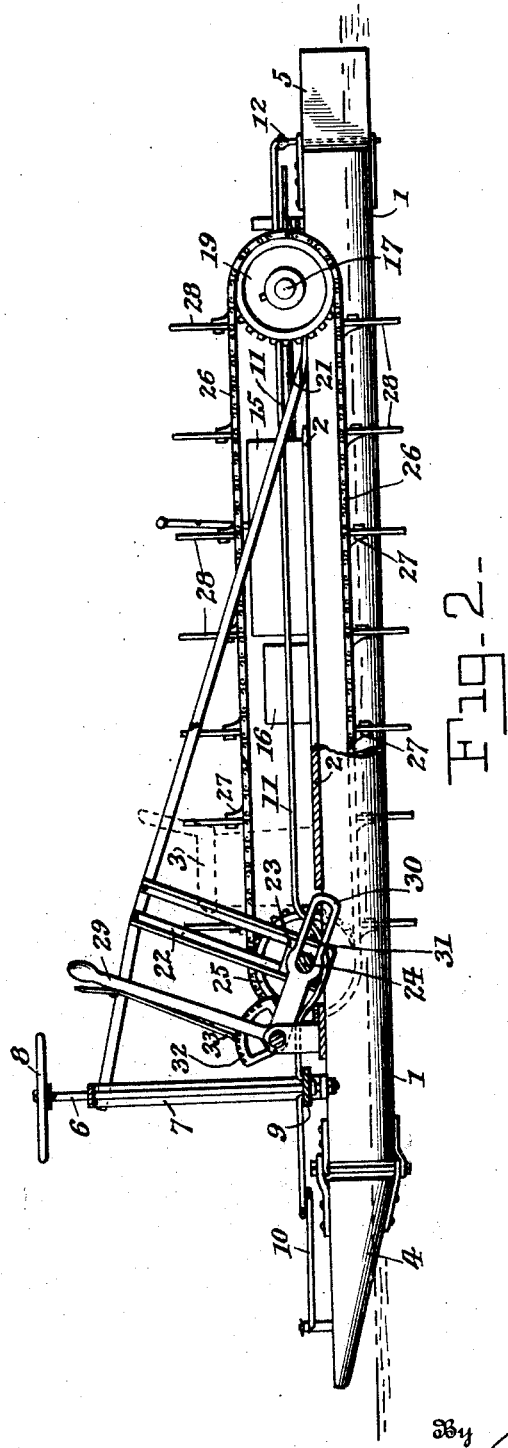

Patented Nov. 6, 1928.

1,690,463

UNITED STATES PATENT OFFICE.

GOTTLOB J. STRADINGER, OF COLBURN, WISCONSIN.

MARINE PROPULSION AND POWER GENERATOR.

Application filed April 4, 1927. Serial No. 180,868.

This invention relates to marine propulsion combined with a power generating plant and it consists in the novel features hereinafter described and claimed.

An object of the invention is to provide simple and efficient means for propelling a marine vessel and also for generating an electric current to be used for lighting or other purposes.

A further object of the invention is to provide a device of the character stated which may be used in a stream of running water for the purpose of generating the electric current when desired and when the marine vessel is anchored or at rest in the stream.

A further object of the invention is to provide simple and efficient means in conjunction with the marine propulsion for regulating the rate of speed at which the vessel will travel through the water by adjusting propeller blades, with which the vessel is provided, vertically or lifting them so that a greater or less number of the blades may serve as paddles in the water.

A still further object of the invention is to provide simple and efficient steering means for the vessel whereby the vessel may be caused to make short turns when desired.

With these and other objects in view the structure includes a vessel preferably made up of spaced pontoons which support a platform. Pilot sections are pivotally connected with the forward ends of the pontoons and rudders are pivoted at the rear ends thereof. A steering gear is mounted upon the pontoons and platform and is operatively connected with the pilot sections and the rudders to cause them to swing or turn simultaneously when the steering shaft of the steering gear is manipulated by the pilot. The propelling mechanism includes a master shaft disposed transversely across the rear portions of the pontoons and carrying at its ends sets of spaced sprocket wheels. A counter shaft is disposed across the forward portions of the pontoons and is provided at its ends with sets of spaced sprocket wheels. Means are provided for raising and lowering the counter shaft. Sprocket chains are trained around the aligned sprocket wheels and propeller blades are carried by the sprocket wheels. An engine is mounted upon the platform and may be operatively connected with the master shaft. A motor generator is mounted upon the platform and may be connected with the engine. A storage battery is mounted upon the platform and may be connected with the motor generator. The motor generator may also be operatively connected with the master shaft.

In the accompanying drawings:

Figure 1 is a top plan view of the combined marine propulsion and power generator.

Figure 2 is a side elevational view thereof with parts shown in longitudinal section, and dotted lines, the section being shown by line 2—2 of Figure 1.

The combined marine propulsion and power generator comprises a pair of pontoons 1 having a platform 2 mounted thereon and bridging the space between them. An operator's seat 3 is mounted upon the platform 2 in the vicinity of the forward end thereof. Pilot sections 4 are pivotally connected with the forward ends of the pontoons 1 and may swing transversely thereof. Rudders 5 are pivoted at the rear ends of the pontoons 1. A steering shaft 6 is journalled in a frame 7 which is mounted upon the forward portions of the pontoons 1 and the said shaft carries at its upper end a steering wheel 8. An arm 9 is carried at the lower portion of the shaft 6 and cross rods 10 connect the end portions of the arm 9 with the forward end portions of the pilot sections. Straight rods 11 connect the end portions of the arm 9 with arms 12 provided at the upper ends of the shafts of the rudders 5.

Thus it will be seen that when the shaft 6 is turned by the pilot who uses the wheel 8, the arm 9 is swung whereby the rods 10 and 11 are moved longitudinally. The said rods in turn swing the pilot sections 4 and the rudders 5 so that the section 4 and the rudder 5 which is connected to the same pontoon swing simultaneously toward or beyond the same side of the said pontoon and thus means are provided for guiding and steering the craft and also for causing the same to make short turns when desired.

An engine 13 is mounted upon the platform 2 and may be connected with a transmission gear 14 of conventional form. A motor generator 15 is mounted upon the platform 2 and may be connected with said transmission mechanism. A storage battery 16 is mounted upon the platform 2 and is electrically connected with the motor generator 15 in conventional form.

A master shaft 17 is disposed across the rear portions of the pontoons 1 and is journalled in bearings 18 mounted thereon.

Spaced sprocket wheels 19 are fixed to the ends of the master shaft 17 and are arranged in pairs, one pair being disposed beyond the outer side of each pontoon. A compensating gear 20 is applied to the intermedate portion of the master shaft 17 and is connected with a drive shaft 21 which in turn is connected with the transmission mechanism 14 in a usual manner.

Upwardly and rearwardly inclined guides 22 are mounted at the forward portion of the platform 2 and in the vicinity of the side edges thereof. Bearing blocks 23 are slidably mounted between the guides 22. A counter shaft 24 is journalled in the blocks 23 and is disposed parallel with the master shaft 17. Sprocket wheels 25 are carried at the ends of the counter shaft 24 and are aligned with the sprocket wheels 19. Sprocket chains 26 are trained around the aligned sprocket wheels 19 and 25. Certain links of the chains 26 are provided with lugs 27 and these lugs carry propeller blades 28 which stand out from the chains and which bridge the space between the set of chains located at the side edge of the vessel. The master shaft 17 is journalled upon the pontoons at such relative distance above the surface of the water that the blades 28 at the lower runs of the chains 26 are normally submerged below the surface of the water while the blades which are carried at the upper runs of the chains are elevated above the surface of the water.

Means are provided for elevating and lowering the counter shaft 24 and the blocks 23 along the guides 22. Such means includes a lever 29 which is fulcrumed upon the platform and which is provided with an arm 30 having a slot 31 which receives the said counter shaft. A gear segment 32 is mounted upon the platform and the said lever is provided with a pawl 33 and adapted to engage the teeth of the segment 32 whereby the said lever may be temporarily held at a fixed position and the counter shaft 24 and its attachments may be temporarily supported at the desired position along the guides 22.

When the lever 29 is swung so that the arm 30 thereof is at the lowermost position the counter shaft 24 is held at the same level as that at which the master shaft 17 is located. When the lever 29 is swung so that the arm 30 is elevated the shaft 24 and blocks 23 are moved upwardly between the guides 22 and thus the blades 28 at the lower runs of the chains 26 and at the forward portion of the vessel are lifted above the surface of the water while the blades which are travelling under the master shaft 17 remain below the surface of the water. Hence it will be seen that means are provided for causing a greater or less number of the blades to enter and operate in the water and consequently, the rate of speed at which the vessel travels may be varied. The greater number of blades which enter the water causes the vessel to travel faster than when a less number is used.

It is obvious that when the engine 13 is operating that rotary movement is transmitted from its shaft through the transmission 14, the drive shaft 21 and compensating gear 20 to the master shaft 17 and hence, direct means are provided for driving the master shaft and operating the chains and propeller blades as hereinbefore described. At the same time, the motor generator 15 may be coupled with the transmission 14 and an electric current may be generated and stored in the battery 16 or used for lights or other purposes. After the battery 16 has been sufficiently charged the generator 15 may be transformed into a motor and the electric current from the battery will operate the same as a motor and by coupling the motor with the shaft 21 and disconnecting the shaft of the engine 13 therefrom the shaft 17 and its attachments may be driven from the electric motor as hereinbefore described. It is also obvious that the engine and motor may be conjointly coupled with the shaft 21 so that they may mutually co-operate with each other in driving the said shaft.

When it is desired to use the structure as a power generator the vessel may be anchored or tied in a stream of running water with its stern disposed in the direction from which the stream is flowing. Thus the running water coming in contact with the blades at the lower runs of the chains will move the chains so that the shaft 17 is rotated and this movement is transmitted through the shaft 21 to the generator 15, operating the same, whereby electric current is generated and which may be stored in the battery 16 or used for lighting or other purposes.

From the foregoing description taken in conjunction with the accompanying drawings it will be seen that a marine vessel is provided with means for propelling the same whereby maximum speed of travel may be attained. This is due to the fact that a great number of propeller blades are at all times working in and below the surface of the water and that the forcing or propelling strain is distributed along the structure of the vessel approximately from the bow end to the stern thereof. The propelling power is applied directly from the blades through the spaced master and counter shaft to the forward and rear end portions of the craft. Furthermore, the blades enter squarely into the water and do not have a tendency to lift the same and consequently, a minimum amount of the propelling energy is lost as the swell from the vessel is reduced to a minimum or eliminated.

From the foregoing description of the construction and operation of this improved device, it will be seen that a simple, inexpensive and efficient means is provided for carrying out the objects of the invention.

While I have particularly described the elements best adapted to perform the functions set forth, it is obvious that various changes in form, proportion and in the minor details of construction may be resorted to, without departing from the spirit or sacrificing any of the principles of the invention.

Having described the invention, what is claimed is:

1. A marine propulsion comprising a vessel, a master shaft journalled thereon, guides mounted thereon, bearings slidably mounted between the guides, a counter shaft journalled in the bearings, chains trained around the shafts, blades carried by the chains, and a lever pivoted upon the vessel and engaging the counter shaft for moving the same along the guides.

2. A marine propulsion comprising a vessel, a master shaft journalled thereon, guides mounted thereon and inclined upwardly and rearwardly toward the master shaft, bearings slidable between the guides, a counter shaft journalled in the bearings, chains trained around the shaft, blades carried by the chains and a lever pivoted upon the vessel and engaging the counter shaft for moving the same along the guides.

3. A marine propulsion comprising a vessel, a master shaft journalled thereon, guides mounted thereon, bearings slidable along the guides, a counter shaft journalled in the bearings, chains trained around the shaft, blades carried by the chains, and an angle lever pivoted upon the vessel and having a slot receiving the counter shaft, the lever adapted to move the counter shaft along the guides, and having its slot disposed toward the master shaft.

In testimony whereof I hereby affix my signature.

GOTTLOB J. STRADINGER.